United States Patent
Fan et al.

(10) Patent No.: US 7,577,866 B1
(45) Date of Patent: Aug. 18, 2009

(54) TECHNIQUES FOR FAULT TOLERANT DATA STORAGE

(75) Inventors: Qun Fan, Northborough, MA (US); Ofer E. Michael, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 541 days.

(21) Appl. No.: 11/167,704

(22) Filed: Jun. 27, 2005

(51) Int. Cl.
*G06F 11/00* (2006.01)

(52) U.S. Cl. .................. 714/6; 714/5; 714/13; 714/43; 714/52

(58) Field of Classification Search .................. 714/52, 714/6
See application file for complete search history.

(56) References Cited

U.S. PATENT DOCUMENTS

| | | | | |
|---|---|---|---|---|
| 4,547,882 | A * | 10/1985 | Tanner | 714/755 |
| 5,206,939 | A | 4/1993 | Yanai et al. | |
| 5,579,475 | A * | 11/1996 | Blaum et al. | 714/7 |
| 5,778,394 | A | 7/1998 | Galtzur et al. | |
| 5,845,147 | A | 12/1998 | Vishlitzky et al. | |
| 5,857,208 | A | 1/1999 | Ofek | |
| 6,138,125 | A * | 10/2000 | DeMoss | 707/202 |
| 6,158,017 | A * | 12/2000 | Han et al. | 714/6 |
| 6,353,895 | B1 * | 3/2002 | Stephenson | 714/5 |
| 6,532,548 | B1 * | 3/2003 | Hughes | 714/6 |
| 6,848,022 | B2 * | 1/2005 | Nanda | 711/114 |
| 6,871,317 | B1 * | 3/2005 | Corbett | 714/800 |
| 6,993,701 | B2 * | 1/2006 | Corbett et al. | 714/770 |
| 7,080,278 | B1 * | 7/2006 | Kleiman et al. | 714/6 |
| 7,134,066 | B2 * | 11/2006 | Hassner et al. | 714/766 |
| 7,188,270 | B1 * | 3/2007 | Nanda et al. | 714/6 |
| 7,219,289 | B2 * | 5/2007 | Dickson | 714/752 |
| 7,240,237 | B2 * | 7/2007 | Delaney | 714/6 |
| 7,263,629 | B2 * | 8/2007 | Corbett et al. | 714/6 |
| 7,318,190 | B2 * | 1/2008 | Edirisooriya | 714/800 |
| 7,356,757 | B2 * | 4/2008 | Chen | 714/800 |
| 7,509,525 | B2 * | 3/2009 | Kleiman et al. | 714/6 |
| 2004/0078642 | A1 * | 4/2004 | Nanda | 714/6 |
| 2006/0129873 | A1 * | 6/2006 | Hafner | 714/5 |

OTHER PUBLICATIONS

Tekram System Co., Ltd., "About RAID 6", 3 pages.
AMCC, Technical Brief, "RAID 6 Double-parity RAID, commonly know as RAID 6, safeguards against data loss during rebuild mode by allowing up to two consecutive drive failures", 2 pages.
Mario Blaum, Jehoshua, Bruck,, and Jai Menon, "EVENODD: An Efficient Scheme for Tolerating Double Disk Failures in RAID Architectures", IEEE Transactions on Computers, vol. 44, No. 2, Feb. 1995, 11 pages.
Article from the Internet, entitled RAID, www.webopedia.com, 4 pages.

* cited by examiner

*Primary Examiner*—Scott T. Baderman
*Assistant Examiner*—Loan Truong
(74) *Attorney, Agent, or Firm*—Muirhead and Saturnelli, LLC

(57) ABSTRACT

Described are techniques for performing data recovery processing for two failed devices included in a set of devices. It is determined whether the two failed devices are each one of the data devices, a horizontal parity device, or a diagonal parity device. Each of the data devices is partitioned into N−1 data segments. The horizontal parity device includes N horizontal parity segments each including parity information for a horizontal grouping of N−1 of the data segments. The diagonal parity device includes N diagonal parity segments each including parity information for a diagonal grouping of N−1 of the data segments. Recovery processing is performed to recover two failed devices in accordance with the diagonal parity device, the horizontal parity device, and the data devices.

20 Claims, 19 Drawing Sheets

| D0 | D1 | D2 | D3 | D4 | D5 | HP |
|---|---|---|---|---|---|---|
| 1 | 2 | 3 | 4 | 5 | | 1 XOR 2 XOR 3 XOR 4 XOR 5 — HP(0) |
| | | | | | | |
| | | | | | | |
| | | | | | | |
| | | | | | | |
| | | | | | | |

FIGURE 4

| D0 | D1 | D2 | D3 | D4 | D5 | HP |
|----|----|----|----|----|----|----|
| 7  | 8  | 9  | 10 |    | 6  | 6 XOR 7 XOR 8 XOR 9 XOR 10 HP(1) |
|    |    |    |    |    |    |    |
|    |    |    |    |    |    |    |
|    |    |    |    |    |    |    |
|    |    |    |    |    |    |    |

FIGURE 5

| D0 | D1 | D2 | D3 | D4 | D5 | HP | |
|----|----|----|----|----|----|----|----|
| 1 | 2 | 3 | 4 | 5 | 6 | 1 XOR 2 XOR 3 XOR 4 XOR 5 | HP(0) |
| 7 | 8 | 9 | 10 | 11 | 12 | 6 XOR 7 XOR 8 XOR 9 XOR 10 | HP(1) |
| 13 | 14 | 15 | 16 | 17 | 18 | 11 XOR 12 XOR 13 XOR 14 XOR 15 | HP(2) |
| 19 | 29 | 21 | 22 | 23 | 24 | 16 XOR 17 XOR 18 XOR 19 XOR 20 | HP(3) |
| 25 | 26 | 27 | 28 | 29 | 30 | 21 XOR 22 XOR 23 XOR 24 XOR 25 | HP(4) |
|  |  |  |  |  |  | 26 XOR 27 XOR 28 XOR 29 XOR 30 | HP(5) |

FIGURE 6

| | D0 | D1 | D2 | D3 | D4 | D5 | DP |
|---|---|---|---|---|---|---|---|
| | 7 | 2 | | | | | 2 XOR 7 XOR 18 XOR 23 XOR 28  DP(1) |
| | | | | | | 18 | |
| | | | | | 23 | | |
| | | | | 28 | | | |
| | | | | | | | |
| | | | | | | | |

FIGURE 8A

| | D0 | D1 | D2 | D3 | D4 | D5 | DP | |
|---|---|---|---|---|---|---|---|---|
| | 1 | 2 | 3 | 4 | 5 | 6 | 1 XOR 12 XOR 17 XOR 22 XOR 27 | DP(0) |
| | 7 | 8 | 9 | 10 | 11 | 12 | 2 XOR 7 XOR 18 XOR 23 XOR 28 | DP(1) |
| | 13 | 14 | 15 | 16 | 17 | 18 | 3 XOR 8 XOR 13 XOR 24 XOR 29 | DP(2) |
| | 19 | 29 | 21 | 22 | 23 | 24 | 4 XOR 9 XOR 14 XOR 19 XOR 30 | DP(3) |
| | 25 | 26 | 27 | 28 | 29 | 30 | 5 XOR 10 XOR 15 XOR 20 XOR 25 | DP(4) |
| | | | | | | | 6 XOR 11 XOR 16 XOR 21 XOR 26 | DP(5) |

| D0 | D1 | D2 | D3 | D4 | D5 | HP | DP |
|---|---|---|---|---|---|---|---|
| 0<br>HP0,DP0 | 0<br>HP0,DP1 | 0<br>HP0,DP2 | 0<br>HP0,DP3 | 0<br>HP0,DP4 | 0<br>HP1,DP5 | HP0 | DP0 |
| 1<br>HP1,DP1 | 1<br>HP1,DP2 | 1<br>HP1,DP3 | 1<br>HP1,DP4 | 1<br>HP2,DP5 | 1<br>HP2,DP0 | HP1 | DP1 |
| 2<br>HP2,DP2 | 2<br>HP2,DP3 | 2<br>HP2,DP4 | 2<br>HP3,DP5 | 2<br>HP3,DP0 | 2<br>HP3,DP1 | HP2 | DP2 |
| 3<br>HP3,DP3 | 3<br>HP3,DP4 | 3<br>HP4,DP5 | 3<br>HP4,DP 0 | 3<br>HP4,DP1 | 3<br>HP4,DP2 | HP3 | DP3 |
| 4<br>HP4,DP4 | 4<br>HP5,DP5 | 4<br>HP5,DP0 | 4<br>HP5,DP1 | 4<br>HP5,DP2 | 4<br>HP5,DP3 | HP4 | DP4 |
|  |  |  |  |  |  | HP5 | DP5 |

Rebuild D30(HP) D31(DP) D51(HP) D53(DP) in parallel
Rebuild D50(HP) D33(DP) D54(DP) in parallel
Rebuild D32(DP) D34(HP) in parallel
Rebuild D52(HP)

FIGURE 13

TECHNIQUES FOR FAULT TOLERANT DATA STORAGE

BACKGROUND

1. Technical Field

This application generally relates to data storage, and more particularly to techniques used in connection with fault tolerant data storage.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

Existing data storage systems may utilize different techniques in connection with providing fault tolerant data storage systems, for example, in the event of a data storage device failure. There are a number of different RAID (Redundant Array of Independent or Inexpensive Disks) levels and techniques that may be used in connection with providing a combination of fault tolerance and/or improved performance for data storage devices. For example, RAID-5 techniques can be used in connection with a data storage system to protect from a single device failure. However, there is no protection with a RAID-5 technique for a double member failure, or two independent device failures of the same RAID group. Additionally, in the event a second fault occurs, for example, during the rebuild/resynchronization process of a RAID-5 system to recover from a first failure, the rebuild will fail with data loss. RAID-6 techniques may be used in connection with protection from such double faults. However, existing RAID-6 techniques may not operate as efficiently as may be desired in connection with resource usage, such as, for example, in connection with computations performed during data updates, or rebuild or recovery processing.

Thus, it may be desirable to utilize an efficient fault tolerant data storage technique able to tolerate two device failures within a same device grouping. It may be desirable that this technique efficiently utilize resources in connection with data update and rebuild or recovery processing.

SUMMARY OF THE INVENTION

In accordance with one aspect of the invention is a method for performing data recovery processing for two failed devices included in a set of devices, said set of devices including N data devices, a horizontal parity device, and a diagonal parity device, the method comprising: determining whether the two failed devices are each one of said data devices, said horizontal parity device, or said diagonal parity device, each of said data devices being partitioned into N−1 data segments, said horizontal parity device including N horizontal parity segments each including parity information for a horizontal grouping of N−1 of said data segments, said diagonal parity device including N diagonal parity segments each including parity information for a diagonal grouping of N−1 of said data segments; and performing recovery processing to recover said two failed devices in accordance with the diagonal parity device, the horizontal parity device, and the data devices. The parity information for said horizontal parity segments and said diagonal parity segments may be formed by performing a logical exclusive-OR operation upon a respective grouping of data segments for each of said parity segments. If the two failed devices include a data device and a failed one of said parity devices, the other of said parity devices may be used in recovering data segments of the failed data device, and the recovered data segments of the failed data device and data segments of non-failing data devices may be used to recover parity information of the failed parity device. If only a single data device fails, the method may further comprise: using at least one of said parity devices in recovering data segments of said single data device. The method may also include: receiving an update operation for a first data segment; updating a first corresponding parity segment of said horizontal parity device formed using a first defined set of data segments including said first data segment; and updating a second corresponding parity segment of said diagonal parity device formed using a second defined set of data segments including said first data segment. The recover processing may include recovering a first data segment at a first processing point, and using said first data segment to recover another data segment at a subsequent processing point. The recovery processing may include recovering a first portion of segments of a failed device in parallel at a first point in processing and recovering a second portion of segments of a failed device in parallel at a second pointing processing in accordance with data dependencies of said failed devices. The N*(N−1) data segments may be numbered consecutively and each ith horizontal parity segment may be formed using a next portion of N−1 consecutively numbered data segments. Each jth diagonal parity segment may be formed using N−1 data segments located on one or more diagonal lines associated with a jth data segment grouping, said data segments of said N devices may be arranged in a matrix of N columns and N−1 rows, each column corresponding to a device and including data segments of that device, an integer value being associated with each set of data segments falling on each diagonal line of said matrix, diagonal lines being drawn in a single direction, data segments included in a jth group include those data segments falling on one or more diagonal lines each having an integer value, d, where d mod N=j, said diagonal lines being consecutively numbered integers.

In accordance with another aspect of the invention is a computer program product for performing data recovery processing for two failed devices included in a set of devices, said set of devices including N data devices, a horizontal parity device, and a diagonal parity device, the computer program product comprising code that: determines whether the two failed devices are each one of said data devices, said horizontal parity device, or said diagonal parity device, each of said data devices being partitioned into N−1 data segments, said horizontal parity device including N horizontal parity segments each including parity information for a horizontal grouping of N−1 of said data segments, said diagonal parity device including N diagonal parity segments each including parity information for a diagonal grouping of N−1 of said data segments; and performs recovery processing to recover said two failed devices in accordance with the diagonal parity device, the horizontal parity device, and the data devices. The parity information for said horizontal parity segments and said diagonal parity segments may be formed by performing a logical exclusive-OR operation upon a respective grouping of data segments for each of said parity segments. If the two failed devices include a data device and a failed one of said parity devices, the other of said parity devices may be used in recovering data segments of the failed data device, and the recovered data segments of the failed data device and data segments of non-failing data devices may be used to recover parity information of the failed parity device. If only a single data device fails, the computer program product may further comprises code that: uses at least one of said parity devices in recovering data segments of said single data device. The computer program product may further comprise code that: receives an update operation for a first data segment; updates a first corresponding parity segment of said horizontal parity device formed using a first defined set of data segments including said first data segment; and updates a second corresponding parity segment of said diagonal parity device formed using a second defined set of data segments including said first data segment. The recovery processing may include recovering a first data segment at a first processing point, and using said first data segment to recover another data segment at a subsequent processing point. The recovery processing may include recovering a first portion of segments of a failed device in parallel at a first point in processing, and recovering a second portion of segments of a failed device in parallel at a second pointing processing in accordance with data dependencies of said failed devices. The N*(N−1) data segments may be numbered consecutively and each ith horizontal parity segment may be formed using a next portion of N−1 consecutively numbered data segments. Each jth diagonal parity segment may be formed using N−1 data segments located on one or more diagonal lines associated with a jth data segment grouping, said data segments of said N devices may be arranged in a matrix of N columns and N−1 rows, each column corresponding to a device and including data segments of that device, an integer value being associated with each set of data segments falling on each diagonal line of said matrix, diagonal lines being drawn in a single direction, data segments included in a jth group include those data segments falling on one or more diagonal lines each having an integer value, d, where d mod N=j, said diagonal lines being consecutively numbered integers.

In accordance with yet another aspect of the invention is a system comprising: a set of devices including N data devices, a horizontal parity device, and a diagonal parity device, each of said data devices being partitioned into N−1 data segments, said horizontal parity device including N horizontal parity segments each including parity information for a horizontal grouping of N−1 of said data segments, said diagonal parity device including N diagonal parity segments each including parity information for a diagonal grouping of N−1 of said data segments; code that determines whether there are two failed devices, and whether each of said two failed devices is one of said data devices, said horizontal parity device, or said diagonal parity device, and code that performs recovery processing to recover said two failed devices in accordance with the diagonal parity device, the horizontal parity device, and the data devices.

BRIEF DESCRIPTION OF THE DRAWINGS

Features and advantages of the present invention will become more apparent from the following detailed description of exemplary embodiments thereof taken in conjunction with the accompanying drawings in which:

FIGS. 4-6 illustrate example representations of data and associated horizontal parity drives that may be used in connection with the techniques described herein;

FIGS. 7-9 illustrate example representation of data and associate diagonal parity drives that may be used in connection with the techniques described herein;

FIG. 13 is an example illustration of one embodiment's data rebuild processing utilizing the techniques described herein;

DETAILED DESCRIPTION OF EMBODIMENT(S)

Figure 1:
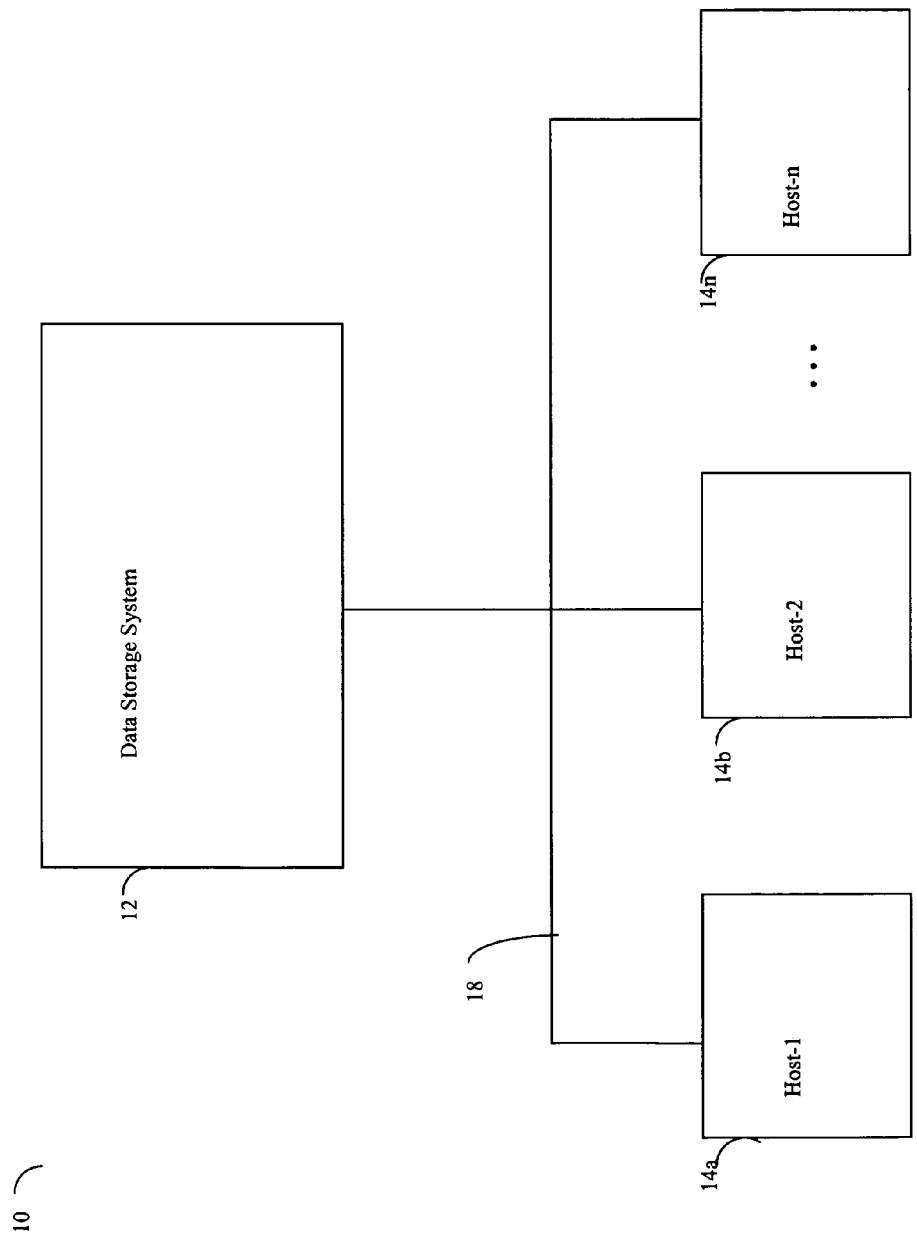
FIG. 1 is an example of an embodiment of a computer system that may utilize the techniques described herein.

Referring now to FIG. 1, shown is an example of an embodiment of a computer system that may be used in connection with performing the techniques described herein. The computer system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the computer system 10.

Each of the host systems 14a-14n and the data storage system 12 included in the computer system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the computer system 10 may use a variety of different communication protocols such as SCSI, Fibre Channel, iSCSI, and the like. Some or all of the connections by which the hosts, management component(s), and data storage system may be connected to the communication medium may pass through other communication devices, such as a Connectrix or other switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
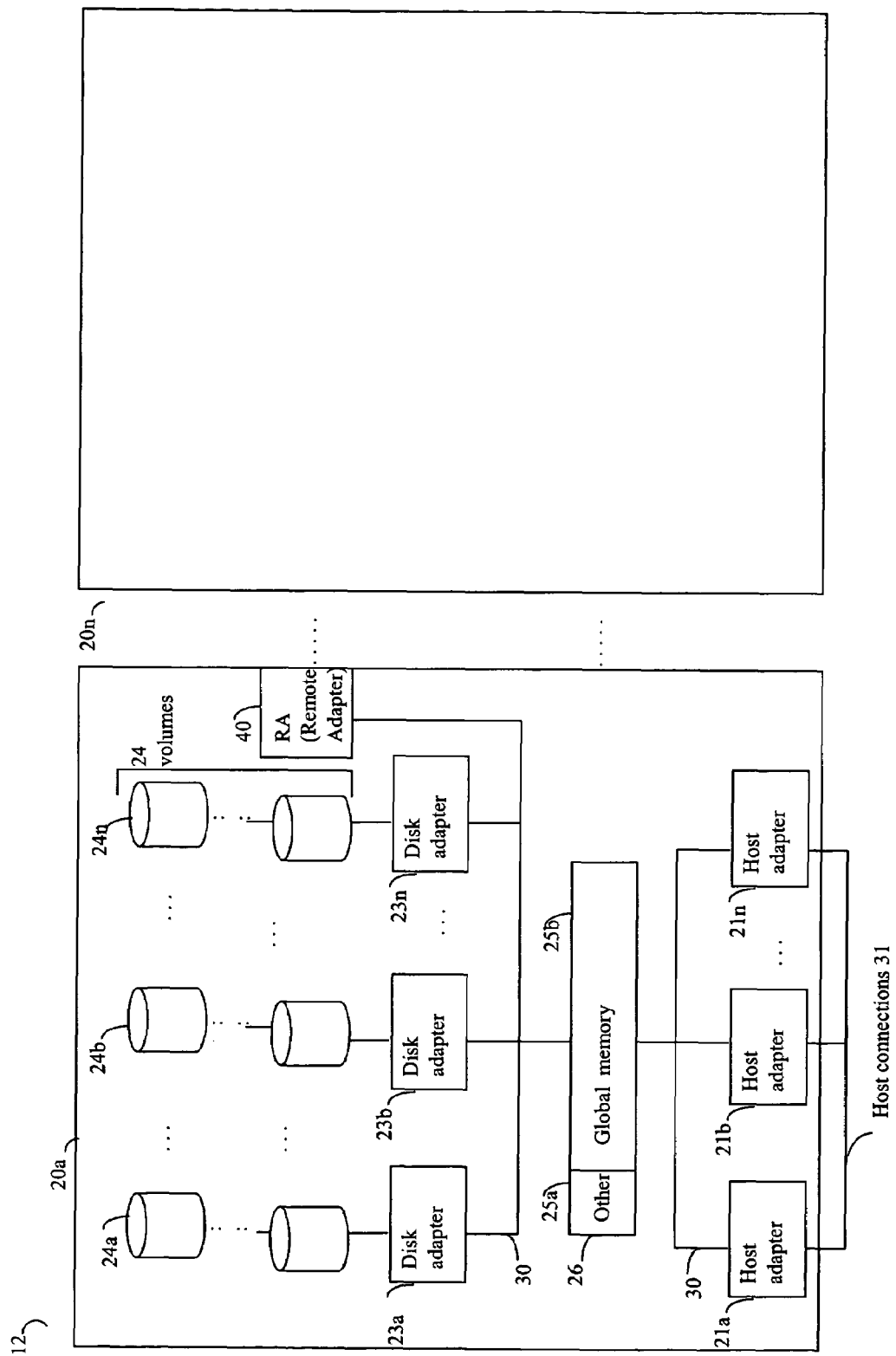
FIG. 2A is an example of an embodiment of a data storage system.

Referring now to FIG. 2A, shown is an example of an embodiment of the data storage system 12 that may be included in the computer system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the computer system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a.

The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

One or more internal logical communication paths may exist between the DA's, the remote adapters (RA's), the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive, or multiple drives. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon.

The DA performs I/O operations on a disk drive. In the following description, data residing on a LV may be accessed by the DA following a data request in connection with I/O operations that other directors originate.

Figure 2B:
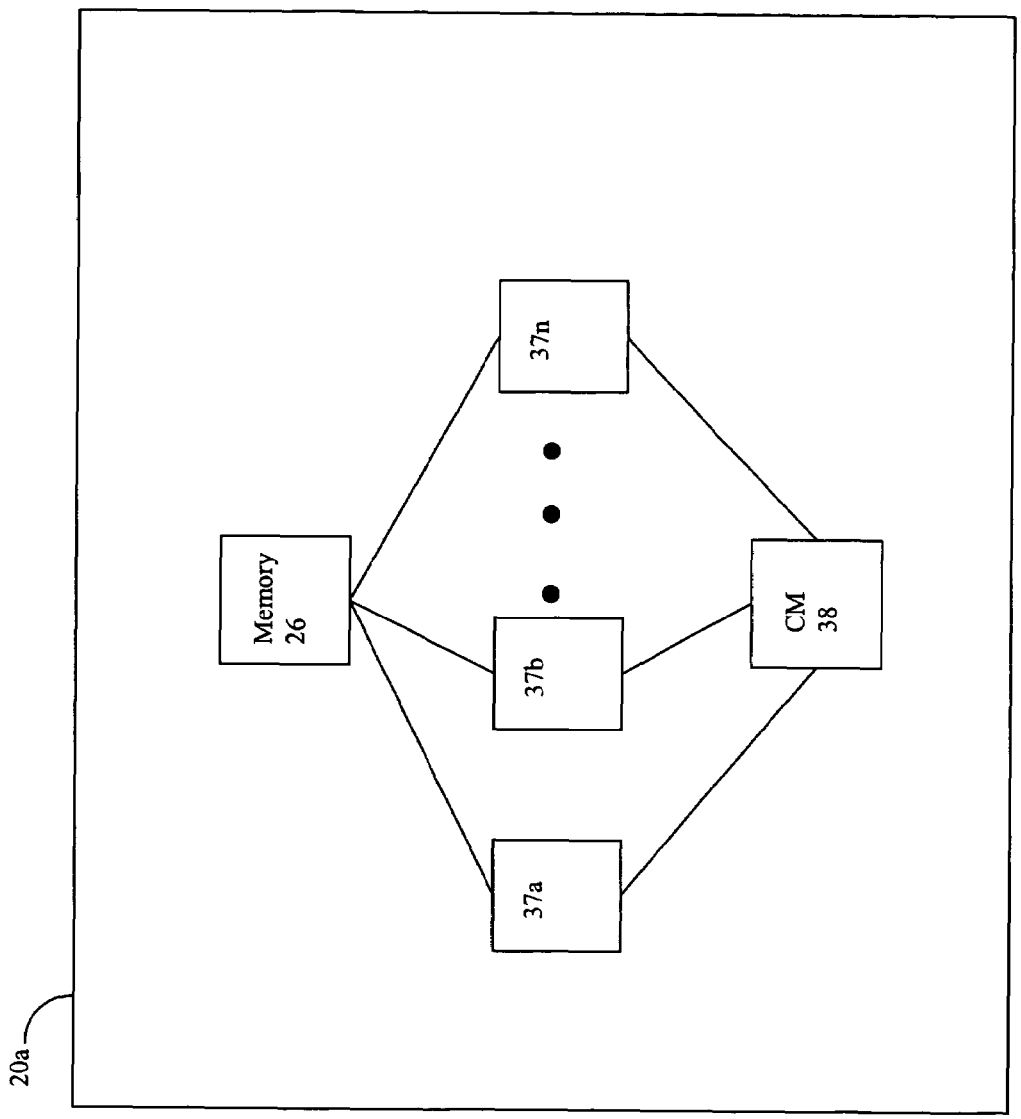
FIG. 2B is a representation of the logical internal communications between the directors and memory included in one embodiment of data storage system of FIG. 2A.

Referring now to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. In an embodiment disclosed herein, there may be up to sixteen directors coupled to the memory 26. Other embodiments may use a higher or lower maximum number of directors that may vary.

The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

As known to those of ordinary skill in the art, different techniques may be used in connection with providing fault tolerant data storage systems. There are a number of different RAID (Redundant Array of Independent or Inexpensive Disks) levels that may be used in connection with providing a combination of fault tolerance and/or improved performance for data storage devices. Different RAID levels (e.g., RAID-1, RAID-5, RAID-6, and the like) may provide varying degrees of fault tolerance. For example, RAID-5 techniques may be used in connection with providing protection in the event of a single device failure within a RAID group. Information is stored in connection with a RAID-5 implementation which allows a data storage system to rebuild or recover the data on the single failed device within a RAID group. However, RAID-5 techniques do not provide protection for two independent devices failures within a RAID group, as may occur, for example, in the event of a second device failure during a rebuild/recovery phase of a first failed device. RAID-6 techniques may be used in a data storage system to provide for such data protection in the event of two independent device failures in a device grouping, such as within a single data storage array.

What will be described in following paragraphs are techniques that may be used in connection with an embodiment utilizing RAID-6. The techniques use a double parity scheme. For N data devices or drives, two parity devices are used. A first parity drive, referred to as the horizontal parity drive, and a second parity drive, referred to as a diagonal parity drive, are utilized in connection with a data unit grouping of size N−1 to encode parity information thereon of the N data drives, as will be described in more detail in following paragraphs.

In the examples described herein, parity information may be determined utilizing the XOR (exclusive-OR) logical operation. However, it should be noted that the parity information utilized in connection with the techniques described herein may be determined using other operations and processing steps as known to those of ordinary skill in the art. XOR may be selected in an embodiment because, for example, due to the efficiency of performing such an operation. The values associated with the XOR logical operation also reflect the correct parity values.

Figure 3:
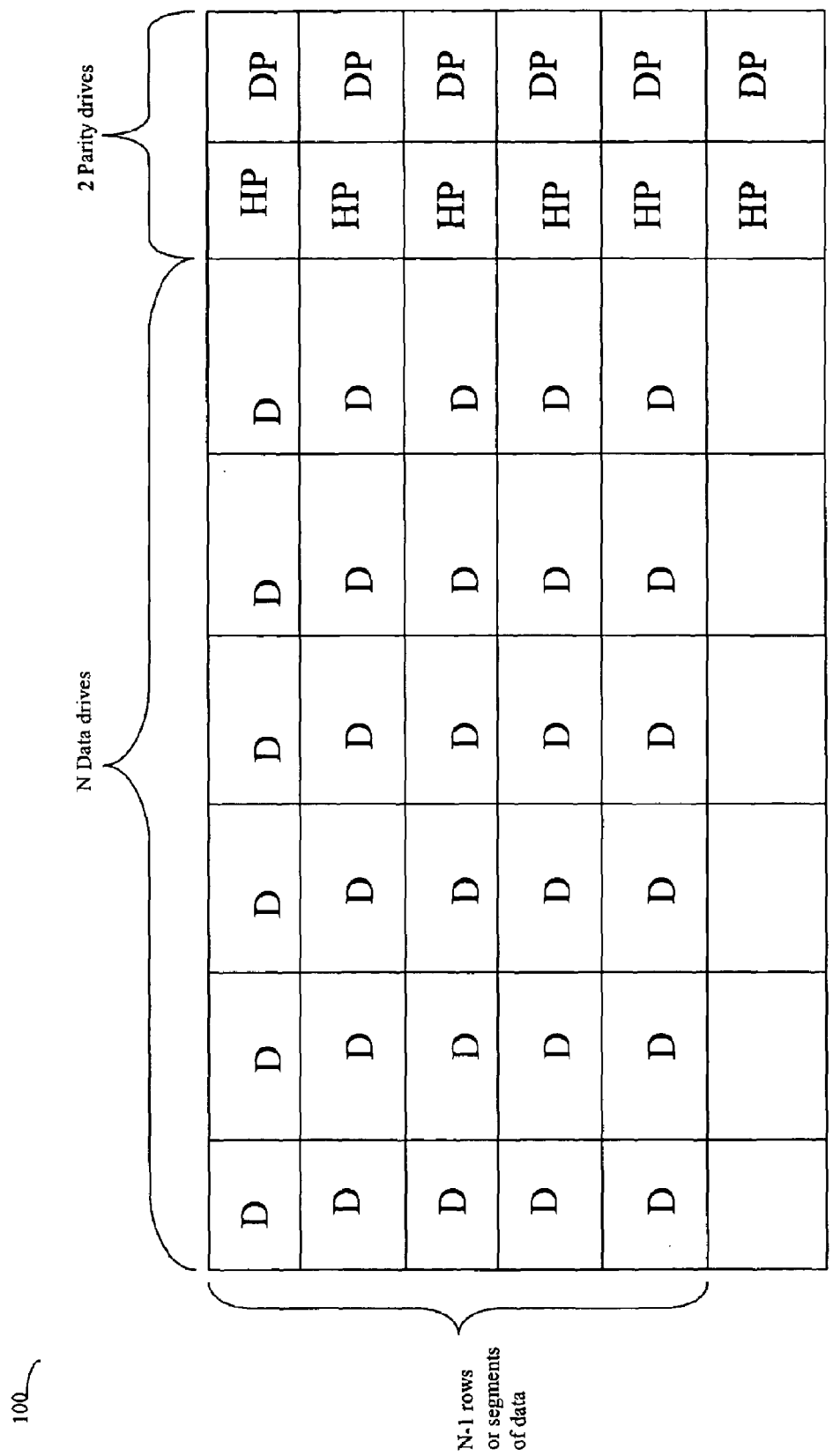
FIG. 3 is an example of a representation of data and associated parity drives that may be used in connection with the techniques described herein.

Referring now to FIG. 3, shown is an illustration 100 of the data segments of each data drive and the horizontal and diagonal parity drives as may be used in connection with the techniques described herein. It should be noted that the particular values used herein for sizes, dimensions, and the like, are selected for the purposes of example and illustration and should not be construed as a limitation of the techniques. The example 100 includes N data drives. Each data drive is represented as a column of N−1 data segments. Each data segment corresponds to an element within a particular column. For each arrangement of N*(N−1) data segments, there are N horizontal parity (HP) segments and N diagonal parity (DP) segments. The particular relationships between data segments (represented as "D" segments or elements in 100) and DP and HP segments are described in more detail in following paragraphs. In one example illustrated herein, a value of N=6 data drives will be used. For the set of N data drives, two parity drives each containing the HP and DP segments or elements as illustrated may be utilized.

It should be noted that each cell or element in the arrangements described herein, for example, as in connection with FIG. 3, may correspond to a symbol of information. The size of a symbol in an embodiment may vary. For purposes of illustration and example, the size may be a single bit. However, the actual symbol size utilized in an embodiment may vary. For example, in one embodiment in which a column of the arrangement corresponds to a stand alone physical storage device such as a disk, a symbol may correspond to data on a single disk sector or other data partitioning scheme that may be used in an embodiment.

Figure 4:
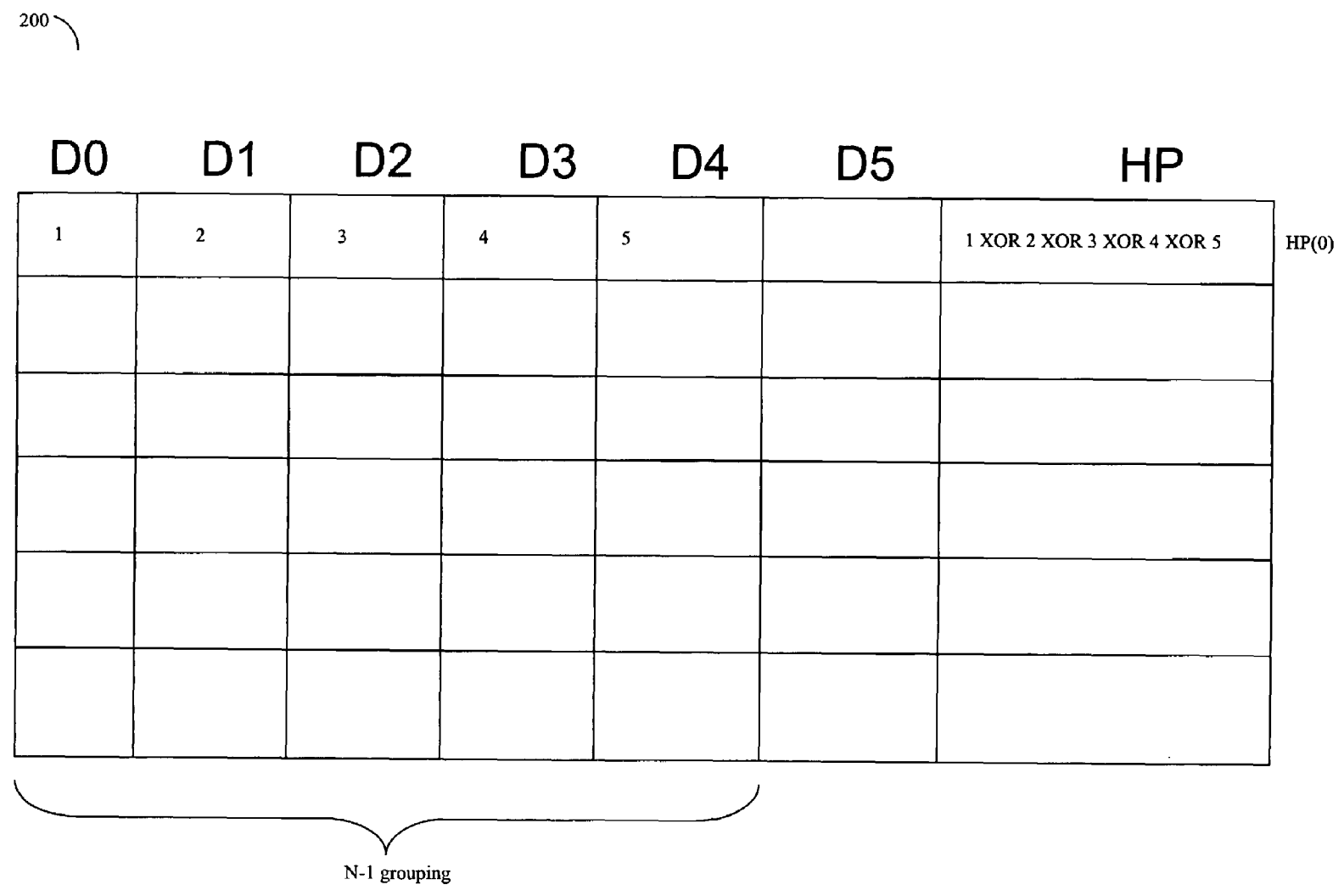
Figure 5:
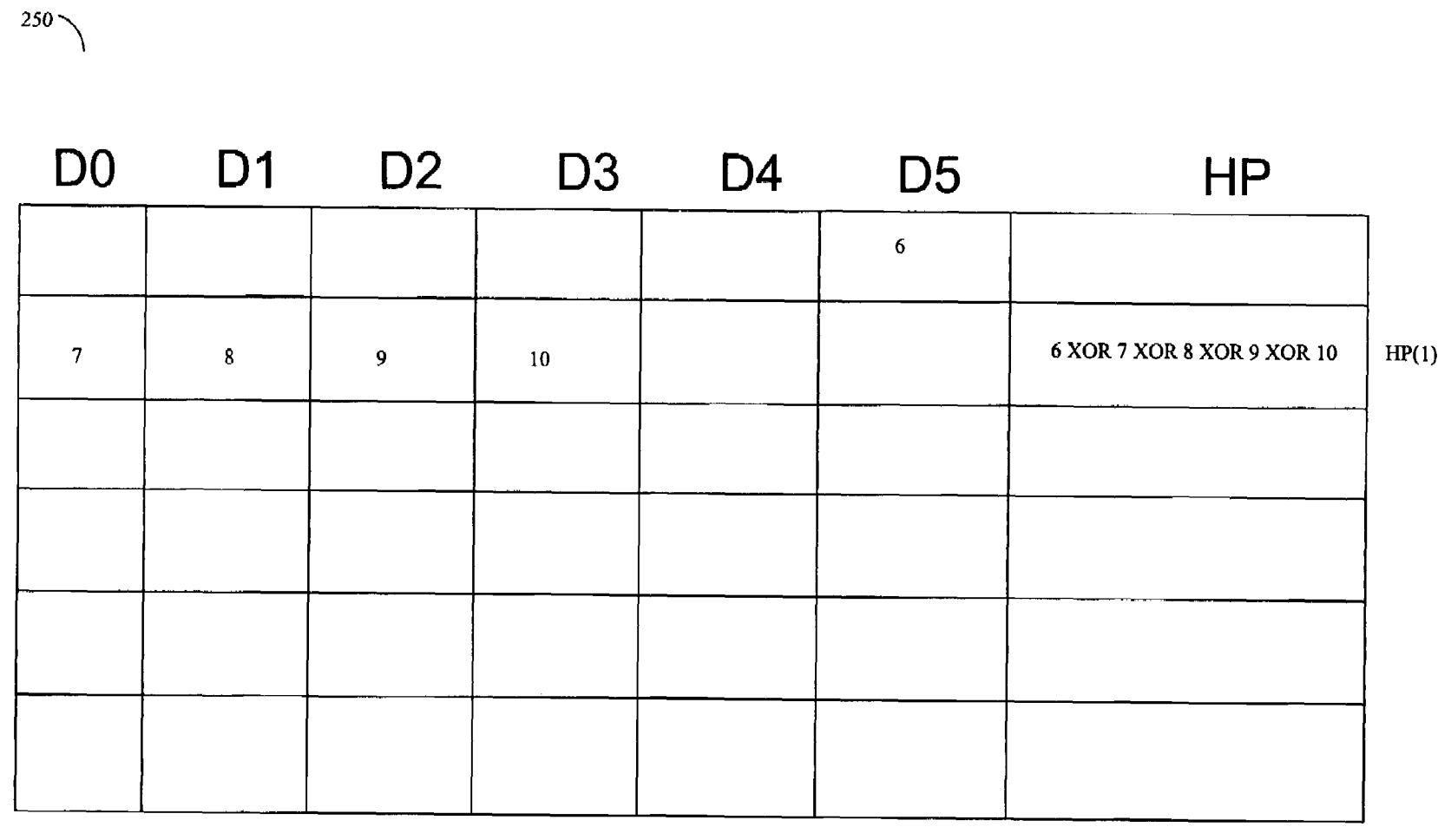

What will now be described in connection with FIGS. 4-6 are processing steps that may be utilized in one embodiment for the formation of the HP segments or elements.

Referring now to FIG. 4, shown is an example 200 illustrating how horizontal parity (HP) segments may be determined in an embodiment. Each HP segment may be formed by performing the exclusive OR logical operation (XOR) of N−1 data segments. Each next grouping of N−1 data segments is used in forming the next consecutive HP segment. As an example, HP(0) of 200 is formed by performing the XOR of data segments 1-5.

Referring now to FIG. 5, the next consecutive HP segment, HP(1), is formed by performing the XOR of data segments 6-10, as illustrated in 200. Subsequently, remaining data segments may be grouped into sets or batches of 5 data segments, each set or batch being associated with a next consecutive HP segment.

Referring now to FIG. 6, shown is an example 300 illustrating how each of the HP segments may be formed from corresponding data segment groupings for all data segments in the N*(N−1) arrangement. All of the data segments may be numbered consecutively, as represented in 300 of FIG. 6, and each consecutively numbered grouping of 5 data segments is used in forming a next HP segment. As illustrated in FIG. 6, for N=6 having an arrangement of N*(N−1) data segments (e.g., 30 in this example) N HP segments may be formed to store thereon the HP parity information encoded as just described.

Figure 7:
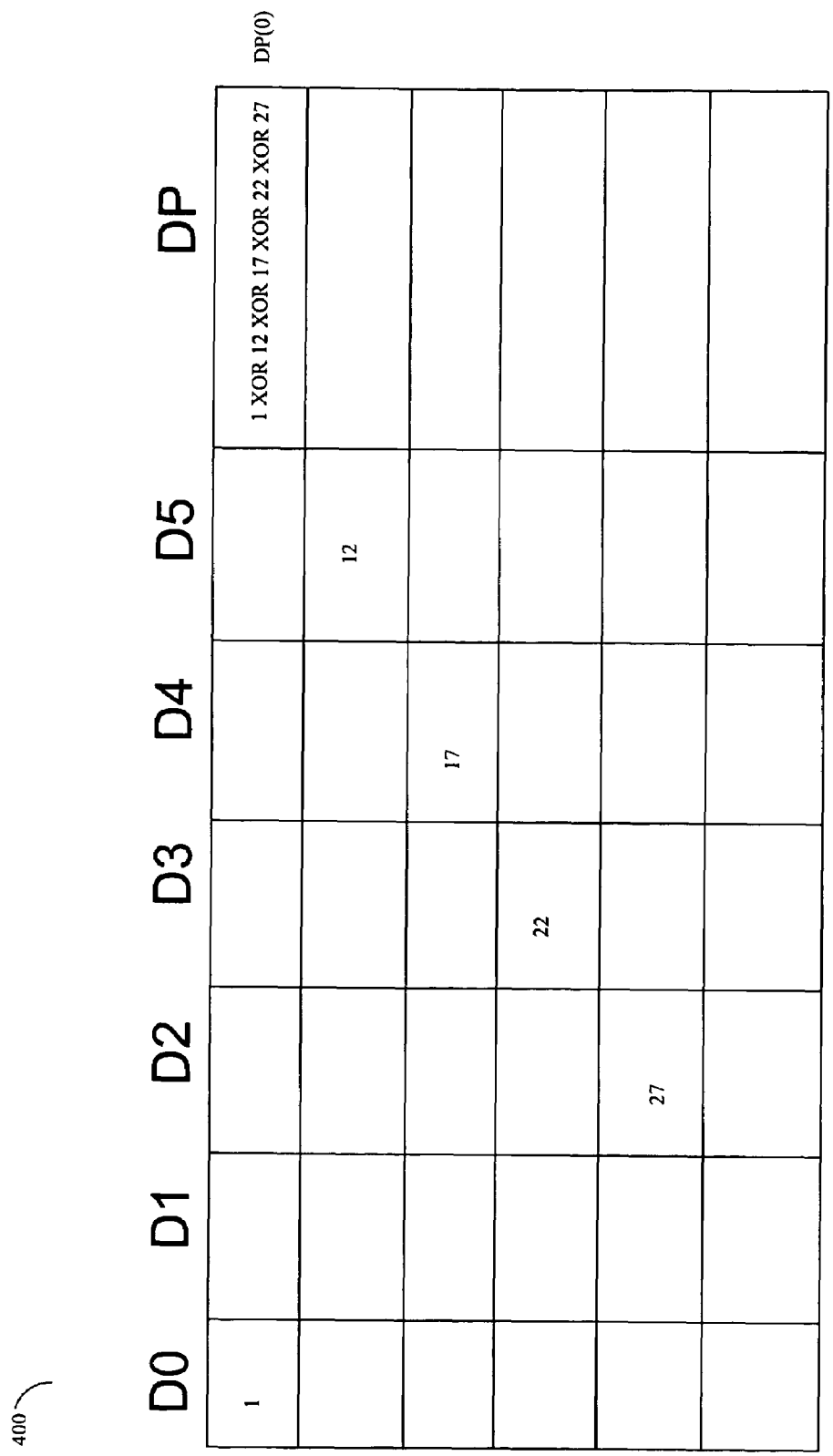

What will now be described in connection with FIGS. 7-9 are processing steps that may be utilized in an embodiment in the formation of the DP segments or elements.

Referring now to FIG. 7, shown is an example 400 illustrating how a first diagonal parity (DP) segment may be determined in an embodiment. Each DP segment may be formed by performing the exclusive OR logical operation (XOR) of N−1 data segments on corresponding diagonal lines of the example 400. The example 400 illustrates the data segments XORed to form the first diagonal parity (DP) segment or element, DP(0). The data segments used in forming an ith DP, 0<=i<=N−1, are the data segments located on each diagonal line, diag d, where d is greater than or equal to 0, and "d mod N=i". Note that "mod" refers to the mathematical modulus function where "C mod D" results in the remainder of C divided by D.

Referring now to FIG. 8A, shown is another example 450 illustrating how a second diagonal parity (DP) segment may be determined.

Figure 8B:
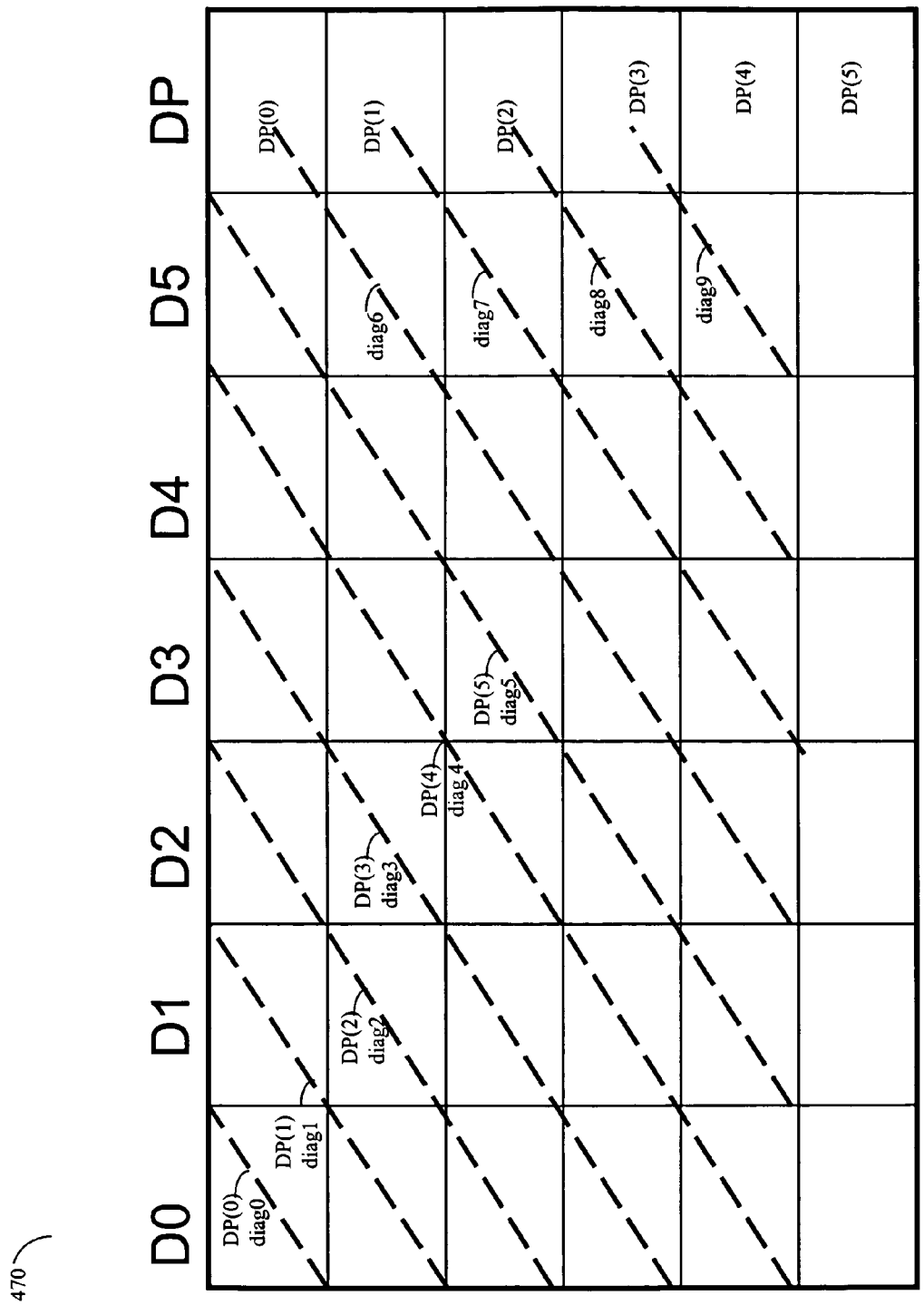

Referring now to FIG. 8B, shown is an example 470 illustrating generally how DP segments are formed from the various data segments located on enumerated diagonal lines of the matrix arrangement of data segments. FIG. 8B illustrates the general formula described above using the "mod" function. Lines may be drawn in the matrix, extending from lower left through upper right, so as to connect data segments located on each diagonal line as illustrated. Such diagonals may be drawn moving from left to right in this example, wherein each diagonal line may be consecutively numbered using zero-based numbering. Once that value associated with each diagonal reaches the value of N−1, the next value for the next diagonal cycles back to 0, in this zero-based example. The number associated with each diagonal line may be used in determining which data segments are used in forming each ith DP element using the relation defined above where each DP(i)=XOR of all data segments falling on diagonals having an associated number, diag, for which diag mod N=i.

Referring now to FIG. 9, shown is an example 500 illustrating how each DP segment or element may be determined with reference to numbered data segments also included in 500.

The following equations may also be used to illustrate how to determine each HP and DP segment or element using the techniques described herein:

Each jth horizontal parity value, HPj, where j=0, 1, . . . , N−1, may be determined by:

HPj=XOR (A[i,horizontal_group_to_segment(i,j)]), for i=0, 1, . . . , N−1, where i represents the drive number, such as each drive number corresponds to a drive as represented by each column noted D0, D1, and the like, of figures herein, and

| horizontal_group_to_segment(i,j) | = INVALID_GROUP | if((i+j) = (N−1)) |
|---|---|---|
| | = j−1 | if((i+j) > (N−1)) |
| | = j | if((i+j) < (N−1)) |

Each jth diagonal parity value, DPj, where j=0, 1, . . . , N−1, may be determined by:

DPj=XOR (A[i,diagonal_group_to_segment(i,j)]), for i=0, 1, . . . , N−1, where i represents the drive number, such as each drive number corresponds to a drive as represented by each column noted D0, D1, and the like, of figures herein, and

| diagonal_group_to_segment(i,j) | = INVALID_GROUP | if ((j+1) = i) |
|---|---|---|
| | = N+j−i | if ((j+1) < i) |
| | = j−i | if ((j+1) > i) |

In the foregoing, it should be noted that the parity for a given data segment of A[i,INVALID_GROUP]=0, the data drive segments are numbered from 0 to N−2, and A[i,j] refers to data segment j of drive i.

The foregoing describes how the different parity segments of elements for corresponding data segments may be encoded, for example, when performing a write operation to a data segment, as described elsewhere herein.

In connection with data recovery processing, if a single data segment used in forming one of each HP or DP segments is to be recovered, the bit values of the single data segment may be determined utilizing one of the known parity value(s) and the known data segments. In the event that more than one data segment used in determining a parity value is unknown, those data segments cannot be recovered at that point in time using that parity value. One of those lost data segments of a failed drive may, however, be recoverable at a later point in time depending on which other data segments have been recovered. This is illustrated in more detail elsewhere herein, for example, where a first recovered data segment may be used in the recovery of a second data segment at a later point in processing.

Figure 10:
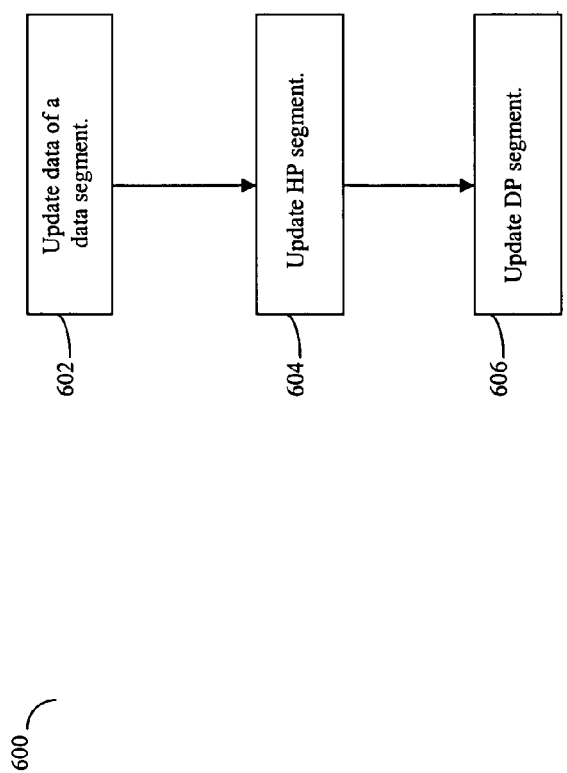
FIG. 10 is a flowchart of processing steps that may be used in an embodiment in connection with performing a data update operation utilizing the techniques described herein.

Referring now to FIG. 10, shown is a flowchart of processing steps that may be performed in an embodiment in connection with an update operation to a data segment included in one of the data drives D0 through D5. A data update operation may be performed, for example, in connection with a host issuing a write operation. As part of processing the write operation, the data storage system including the target location of the write operation may also perform the processing of flowchart 600 of FIG. 10. At step 602, an update operation, such as a write operation, may be performed to a track, block or other portion of a data storage device. The corresponding data segment for that portion being modified is determined in connection with step 602. At step 604, as part of performing the update operation, the corresponding HP element or segment for the data segment being modified is also updated. For example, with reference to FIG. 6, if data segment 1 (in device D0) is updated, the corresponding HP element, HP(0) is also updated so that the parity of HP(0) is representative of the parity after applying the write or other update operation. At step 606, as part of performing the update operation, the corresponding DP element for the data segment being modified is also updated. For example, with reference to FIG. 9, if data segment 1 is updated, the corresponding DP element, DP(0), is also updated so that the parity of DP(0) is representative of the parity after applying the write or other update operation.

The foregoing describes how to encode each DP and HP segment in connection with a data update operation. What will now be described is how to use one or more of the foregoing parity segments included in the two parity drives in connection with performing a data recovery or rebuilding operation in the event of one or more device failures.

Figure 11:
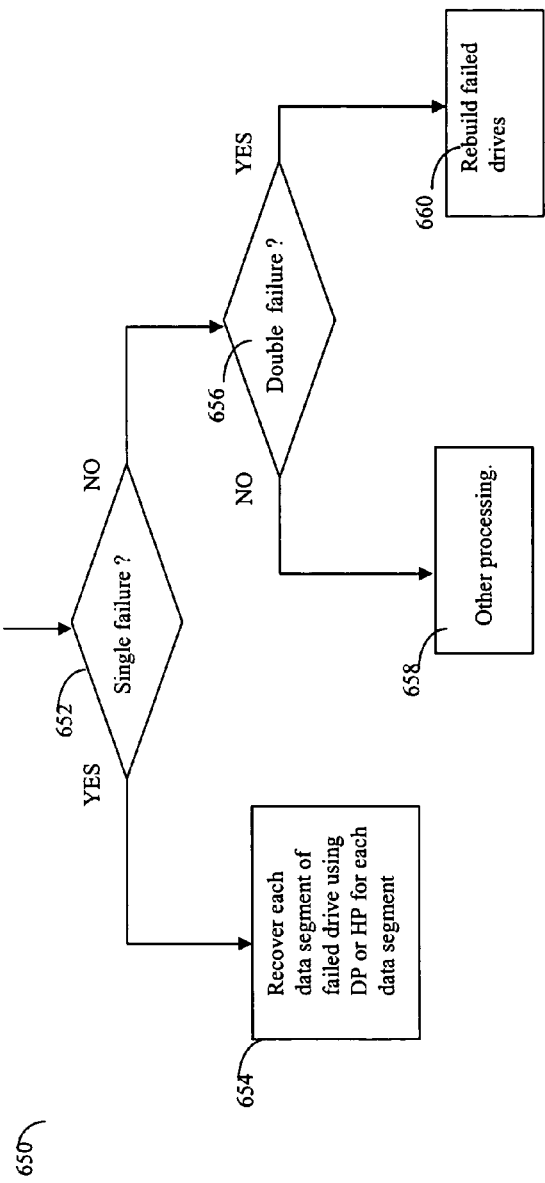
FIG. 11 is a flowchart of processing steps that may be used in an embodiment in connection with performing data recovery processing utilizing the techniques described herein.

Referring now to FIG. 11, shown is a flowchart of processing steps that may be performed in an embodiment in connection with performing data recovery processing upon the detection of a device or drive failure. At step 652, a determination is made as to whether there is a single device failure. If it is a single device failure, control proceeds to step 654 where data recovery processing is performed for the single failed device. An embodiment may recover each data segment of a failed device using either the DP or HP segment associated with each data segment. For example, if device D5 fails, data segment 6 may be recovered using either HP(1) (e.g., see FIG. 6) or DP(5) (e.g., see FIG. 9). If step 652 determines that a number of devices that failed is more than a single device, control proceeds to step 656 where a determination is made as to whether there is a double failure or two device faults within the same group of N devices. If more than 2 devices have failed at a time, control proceeds to step 658 for other processing. Otherwise, control proceeds to step 660 to rebuild the data segments of the failed devices. It should be noted that the two failed devices may be two failed data devices, one failed data device and one of the parity drives (HP or DP), or both of the parity devices. Different processing is described in following paragraphs in accordance with which particular drives have failed.

As will be apparent to those of ordinary skill in the art, there may be a variety of different ways and processing steps in which to recover the various data segments of the two failed drives. For two failed data drives depending on which drives have failed, different data segments included therein may be recoverable using an associated HP and/or DP segment. A data segment recovered at a first point in time may be used in restoring a different data segment of the same device at a later point in time depending on which data segments are known and used in forming the various HP and DP segments.

Figure 12:
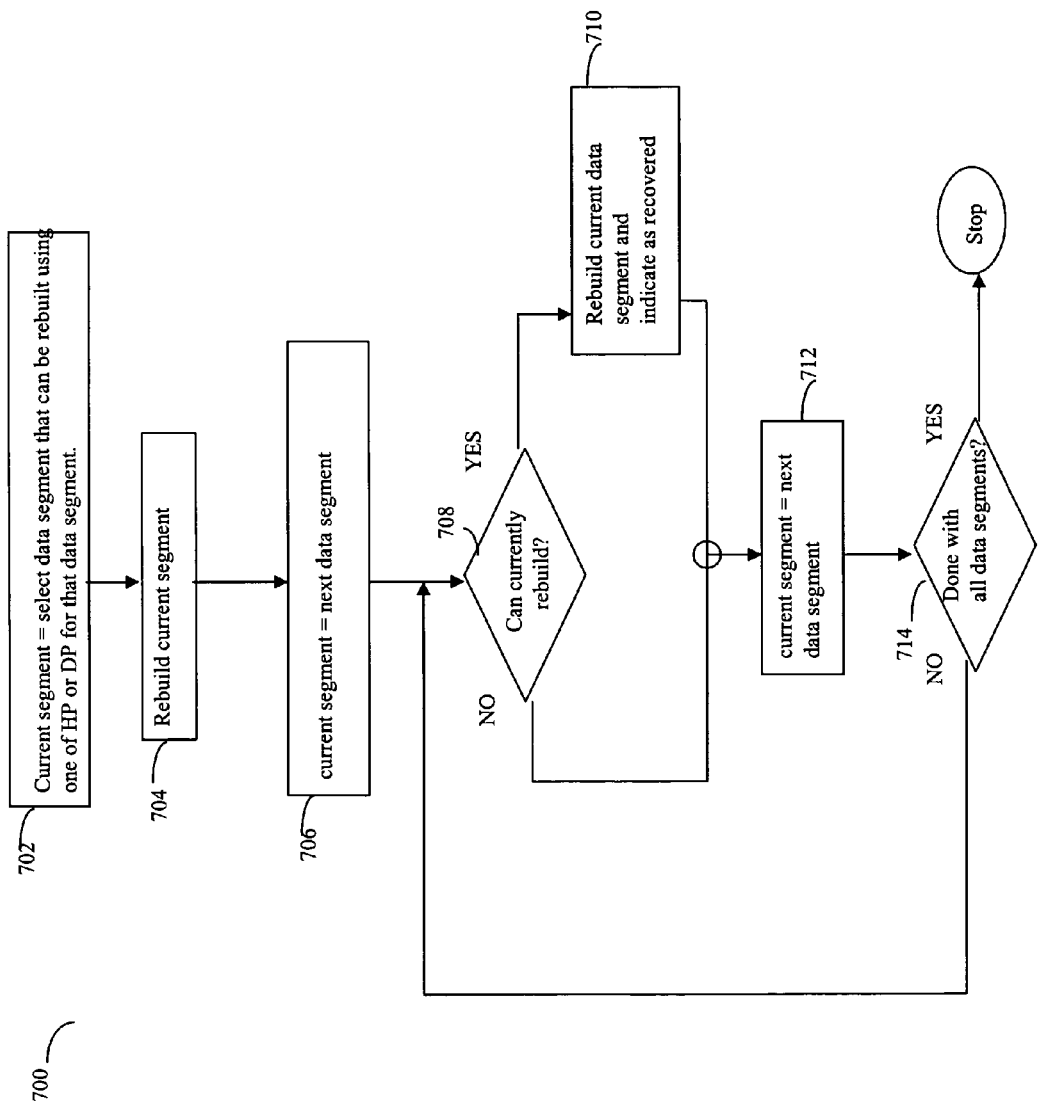
FIG. 12 is a flowchart of more detailed processing steps that may be used in an embodiment in connection with performing data recovery processing utilizing the techniques described herein.

Referring now to FIG. 12, shown is a flowchart of processing steps that may be performed in an embodiment in connection with rebuilding data segments of two failed data drives within the same RAID group. In connection with the processing of flowchart 700, the data segments of the two failed drives may be included in a single list. As a segment is rebuilt, the segment may be removed from the list, or otherwise indicated as having been recovered. At any point in time, the data segment list identifies those data segments that have not yet been recovered in connection with both failed drives. At step 702, one of the data segments in the list is selected. The selected data segment is one that can be rebuilt using one of the HP or DP element for that selected data segment. At a current processing point, it may be that a particular data segment may not yet be able to be recovered using its corresponding HP or DP element depending on which drives have failed. For example, with reference to FIGS. 6 and 9, if drives D0 and D4 fail, processing cannot begin with recovery of the first segment 1, data segment 1, of D0 due to the dependencies between the data segments of failed drives D0 and D4, and associated HP and DP elements. For example, HP(0) is dependent on D0 and D4. Thus HP(0) cannot be used to determine data segment 1 at this time since no data segments of D0 and D4 have been recovered. DP(0) also cannot be used to determine data segment 1 since DP(0) also is dependent on D0 and D4 elements. Processing can, however, begin with data segment 19 of failed drive D0 using DP(3).

An embodiment may use any one or more different techniques in connection with selection of an initial data segment to be recovered. For example, an embodiment may walk the list of failed data segments and commence recovery with the first data segment possible. The list of data segments may be ordered, for example, with all data segments from a first failed drive followed by all data segments from the second failed drive. The list may also include data segments in other orders. The selected data segment for rebuilding is represented by the variable current segment in this example. At step 704, rebuilding of the current segment proceeds with either the HP or DP element. It should be a noted that a current segment may be able to be rebuilt using one or both of its corresponding DP and HP segments. Whether both the corresponding HP and DP segments, one, or none of these segment may be used in connection with recovering a data segment may vary with a current processing state at a point in time. For example, a first data segment recovered at a first processing point may affect whether restoration of a second data segment at a later point in time is possible if both the first and second data segments are used in determining a same HP or DP segment. For example, referring back to failed drives D(0) and D(4), initially, both data segment 1 of D(0) and data segment 5 of D(4) are not currently able to be recovered at the start of data recovery processing. It is not possible to determine one of these data segments using HP(0) initially. However, at a later point in processing, one of the data segments, such as data segment 5, may have been recovered as a result of other recovery processing steps using other DP and/or HP segments. Subsequent to this later point in time resulting in data segment 5's recovery, HP(0) may be used to determine data segment 1.

At step 706, current segment is assigned the next data segments in the list of data segments of failed devices. At step 708, a determination is made as to whether the current segment is able to be rebuilt based on known parity information and any data segments that have been recovered to this current processing point. If so, control proceeds to step 710 to rebuild or recover the current segment, and then remove the current segment from the list, or otherwise indicate the current segment as being recovered. In connection with step 710 processing, it may be possible to recover a data segment using one or both of the data segment's corresponding HP and DP elements. If either a DP or HP element may be used in connection with recovering a lost data segment, an embodiment may use either in connection with data recovery. Control proceeds to step 712. If step 708 determines that the current segment cannot currently be recovered, control proceeds to step 712.

At step 712, current segment is assigned the next unrecovered data segment of the failed drives. At step 714, a determination is made as to whether all data segments of the failed drives have been recovered. If so, processing stops. Otherwise, control proceeds to step 708 to continue processing with the current segment until all data segments of the failed drives have been recovered.

It should be noted that the processing steps of flowchart 700 describe a generalized process that may be utilized in an embodiment in order to recover lost data segments of failed data drives. For example, an embodiment may order the data segments on the list of data segments to be recovered as follows: a first data segment from a first failed drive, a first data segment from the second failed drive, a second data segment from the first failed drive, a second data segment from the second failed drive, and so on. In connection with performing data recovery processing of step 710, the embodiment may alternate between using HP and DP values when possible when restoring each data segment. Other techniques may be used in connection with processing steps of flowchart 700 and may vary within each embodiment.

Following is a pseudocode-level description of processing steps of another method that may be performed in an embodiment in connection with rebuilding two failed data drives using segments of the HP and DP drives as described herein. The following may be performed in an embodiment, for example, as alternative to the processing steps of flowchart 700 of FIG. 12.

REBUILD pseudocode

MAX_DATA_DRIVE = N (data drive numbered from 0 to N−1)

MAX_SEGMENT_PER_DRIVE = N−1 (segment numbered from 0 to N−2)

To recover two data drives, numbered x and y:

1. Determine the higher drive number. Set y to be the higher drive number drive.

If( x >y) {
   tmp = x;
   x = y;
   y = tmp;
}

2. Determine the 'distance' between the two drives numbers as may be defined as the result of subtracting the values x and y.

distance = y − x;

3. Choose a starting segment to work on from the two drives based on the distance calculated and the drive number. In this example, the first segment will be recovered from the first drive based on the corresponding diagonal parity, DP. Subsequently, the next segment from the second drive may be recovered using a horizontal parity HP, the next segment from the first drive using DP, the next segment from the second drive using HP, and so on, until there is not a valid diagonal or horizontal segment on one of the failed data drives for a designated parity element or gouping (e.g., not a valid data segment to be rebuilt for one of the HPi or DPi.) In this instance, processing for that path originating from a selected starting point, A or B, as defined below, will stop. In this example, the data segments for each of the failed drives may be referenced using zero-based or 1-based notation. A failed drive x or y includes data segments that may be referenced by column and row number, column number referring to the failed drive, and row number referring to the particular data segment in that failed drive.

Two starting points defining the start of two paths:

A. D[(x), (distance-1)] (x is column number of first drive, distance-1 is row number) or B. D[(y), ((N−2)-(distance-1))] (y is column number of second drive, ((N−2)−(distance-1)) is row number For A:

diagonal_segment_number = D[(x), (distance-1)]

While(1) {
   REBUILD_THROUGH_DIAGONAL(diagonal_segment_number);
   z = HORIZONTAL_GROUP_NUMBER(x, distance-1);
   horizontal_segment_number = SEGMENT_NUMBER_FOR_HORIZONTAL_GROUP(y, z);
   if(horizontal_segment_number doesn't exist)
   break out the loop (done this path)
   else {
   REBUILD_THROUGH_HORIZONTAL(D[y,horizontal_segment_number]);
   diagonal_segment_number = SEGMENT_NUMBER_FOR_DIAGONAL_GROUP(x,z);
   if(diagonal_segment_number doesn't exit) {
   break out the loop (done this path)
   } else {
   continue the loop
   }
}
}

Perform the same processing beginning with B, either in parallel or serial. The two paths originating from starting points A and B cover all segments on the two failed drives.

Used in the foregoing pseudocode are the following which may be defined in a variety of different ways such as, for example, macros utilizing predefined tables of values.

HORIZONTAL_GROUP_NUMBER(drive, segment)

SEGMENT_NUMBER_FOR_HORIZONTAL_GROUP (drive, group)

SEGMENT_NUMBER_FOR_DIAGONAL_GROUP (drive, group)

An embodiment may predefine one or more tables to return values for each of the foregoing. For example, a table may be defined which lists all of the data segments included in a corresponding DP grouping, such as DPi, in accordance with FIG. 9, and a table listing all data segments included in a corresponding HP grouping, such as HPi, in accordance with FIG. 6.

An embodiment may also predetermine prior to execution which data segments may be rebuilt using which particular HP and/or DP elements. This information may be stored in table or other data structure known to those of ordinary skill in the art. The information may also include data describing which data segments may be determined in parallel as well as designate an ordering in which the data segments of particular failed drives may be recovered.

Figure 12A:
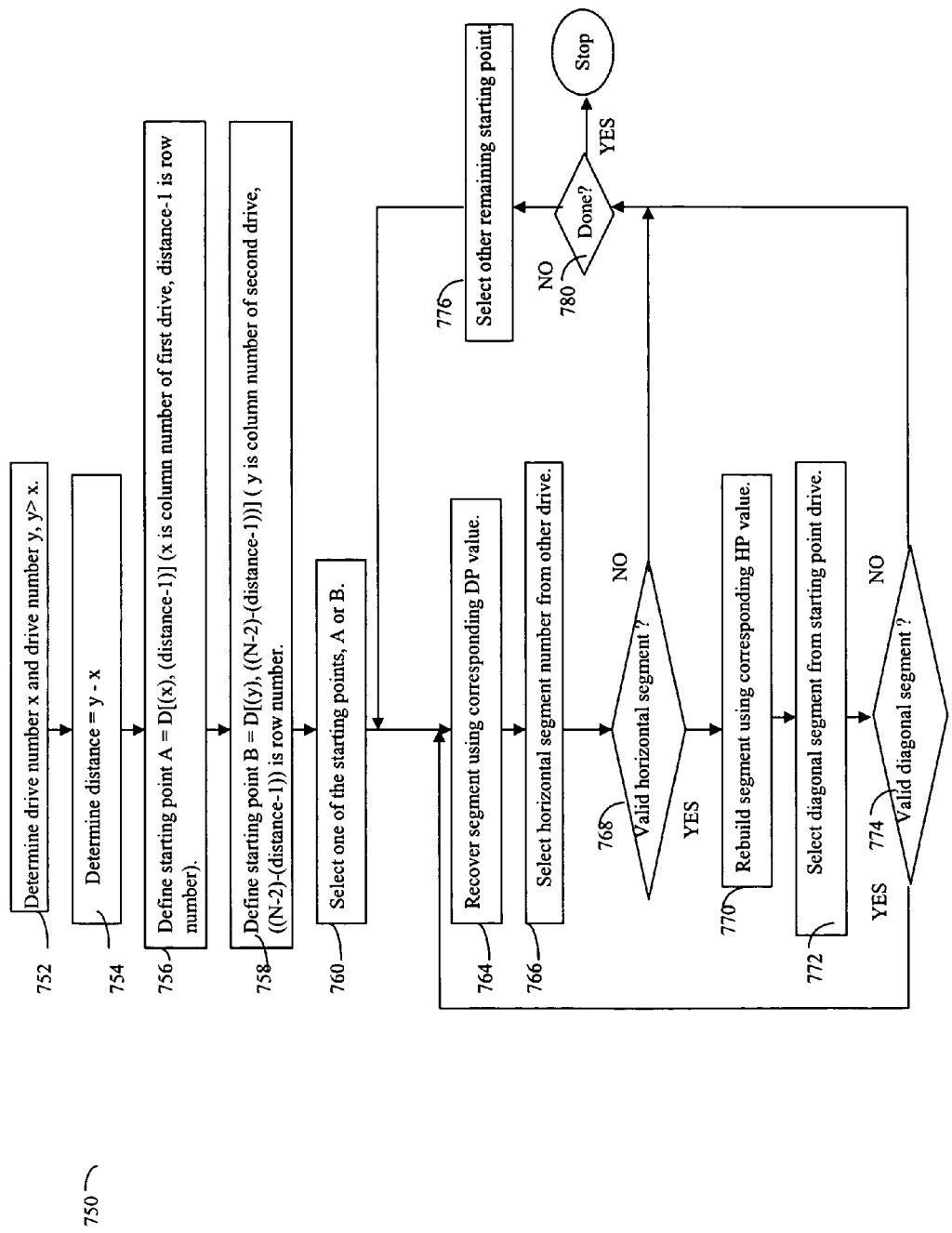
FIG. 12A is a flowchart of processing steps of one embodiment for recovery processing in connection with two failed data drives.

Referring to FIG. 12A, shown is a flowchart of processing steps of that may be performed in an embodiment in connection with performing recovery processing upon the occurrence of two failed data drives in the same RAID group. The steps of flowchart 750 summarize the processing described above in connection with the foregoing REBUILD pseudocode. Generally, the processing of flowchart 750 provide two starting points within each of the failed data drives. One of the starting points is selected. A corresponding DP value for that starting point drive's selected segment is recovered. Subsequently a segment of the other failed drive is selected for recovery using its corresponding HP value. Processing continues by selecting a segment from the starting point drive for recovery using its corresponding DP value and a selecting a segment from the other drive for recovery using its corresponding HP value until a selected segment is not a valid diagonal or horizontal segment on one of the failed drives. Processing steps are similarly performed in accordance with the remaining starting point.

At step 752, drive numbers x and y are determined such that y is greater than x. At step 754, the distance is determined as y−x. At step 756, a starting point A, representing a segment within drive x, is determined as represented by D[x, distance-1], where "distance-1" is the row number within drive x corresponding to the data segment. At step 758, a starting point B, representing a segment within drive y, is determined as represented by D[y, (N−2)-(distance-1)] where "(N−2)−(distance-1)" is the row number within drive y corresponding to the data segment. At step 760, one of the starting points A or B is selected. At step 764, the selected segment of the starting point is recovered using its corresponding DP value. At step 766, a horizontal segment number is selected from the other failed drive. The particular segment selected in one embodiment may be determined as:

z=HORIZONTAL_GROUP_NUMBER of (x,distance-1);
horizontal_Segment_number=
SEGMENT_NUMBER_FOR_HORIZONTAL_GROUP
(y,z);

as described in connection with the REBUILD pseudocode.

At step 768 a determination is made as to whether the horizontal_segment_number references a valid horizontal segment. If not, processing continues with step 780 where a determination is made as to whether processing is done for both starting points. If so, processing stops. Otherwise, control proceeds to step 776 to continue with the other remaining starting point. Control proceeds to step 764.

If step 768 determines that the horizontal segment is valid, control proceeds to step 770 where that segment is rebuilt or recovered using its corresponding HP value. At step 772, a diagonal segment is selected from the starting point drive. The diagonal segment number may be determined as:

diagonal_segment_number =SEGMENT_NUMBER_FOR_DIAGONAL_GROUP(x,z);

as described elsewhere herein in connection with the REBUILD pseudocode. At step 774, a determination is made as to whether the diagonal_segment_number is valid. If so, processing continues with step 764. Otherwise, control proceeds to step 780.

Referring to FIG. 13, shown is an example representation of processing steps that may be performed in an embodiment in connection with data recovery for failed drives. The example in 800 indicates two failed data drives, D3 and D5. The element 820 designates a particular data segment recovery ordering including which data segments may be recovered in parallel at each processing point. In this example, the predetermined information includes four rebuilding steps designating which data segments may be recovered in parallel at each rebuilding step. Additionally, this example indicates whether a corresponding HP or DP value for that particular data segment being recovered is used in the data recovery processing. This information may be stored in a structure defining processing orderings for recovery when data drives D3 and D5 fail regarding an ordering in which data segments of particular failed drives are to be recovered. The information may also designate which data segments at which processing step may be recovered in parallel, and which one or more parity values, corresponding HP and/or DP element, may be utilized. Alternatively, an embodiment may perform some or all of the processing determination at run time. For example, an embodiment may predetermine and store all of the information included in 820 except for a designation as to which HP and/or DP value to use. An embodiment may not perform parallel processing of data segment rebuilding and may designate a data segment recovery ordering and which of the HP and/or corresponding DP elements may be used for each data segment.

It should be noted that included in each of the data segments of FIG. 13 is that data segment's corresponding DP and HP grouping information.

In connection with the techniques described herein, one or both of the failed drives may be a parity drive. In the event that both drives that fail are parity drives HP and DP, the parity information can be recovered by reading all the data segments and recalculating HP and DP values as described herein.

In the event that one of the failed drives is a data drive and the other is the HP drive, the DP elements and other non-failing drives' data segments may be used in determining each data segment of the failed drive. For example, assume HP and D0 fail. For purposes of this example, let D0 include data segments 1, 7, 13, 19, and 25 each having diagonal parity groupings as defined and described with reference to FIG. 9. DP(0) and other data segments 12, 17, 22, and 27 of non-failing data drives included in the DP(0) grouping may be used to recover data segment 1, DP(1) and other data segments included in DP(1) grouping may be used to determine data segment 7, and so on. Subsequently, the HP values may be recalculated once all data segments of the failed data drive D0 have been recovered using the DP values.

In the event that one of the failed drives is a data drive and the other is the DP drive, the HP elements and other non-failing drives' data segments may be used in determining each data segment of the failed drive. For example, assume DP and D0 fail. For purposes of this example, let D0 include data segments 1, 7, 13, 19, and 25 each having horizontal parity groupings as defined and described with reference to FIG. 6. Data segment 1 may be recovered using HP(0) and other data segments 2, 3, 4, and 5 of non-failing drives included in the HP(0) grouping. Similarly, HP(1) and other data segments of non-failing drives included in the HP(1) grouping may be used to determine data segment 7, and so on. Subsequently, the DP values may be recalculated once all data segments of the failed drive Do have been recovered using the HP values.

Figure 14:
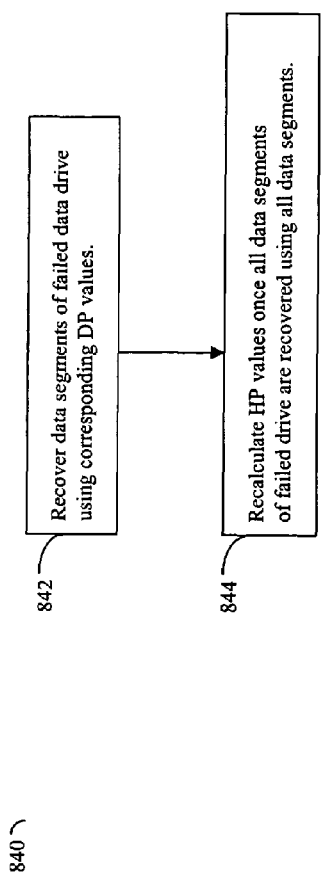
FIG. 14 is a flowchart of processing steps that may be performed in an embodiment for data recovery processing for a failed data drive and a first parity drive.

Referring now to FIG. 14, shown is a flowchart of processing steps that may be performed in an embodiment in connection with data recovery when the two failed drives are a data drive and the HP drive. The steps of FIG. 14 summarize the processing steps described above. At step 842, the data segments of the failed drive are recovered using DP values and data segments of non-failed drives included in each DP grouping, for example, as illustrated in FIG. 9. At step 844, once all the data segments of the failed drive have been recovered, the HP values may be recalculated in accordance with the defined HP groupings, for example, as illustrated in FIG. 6.

Figure 15:
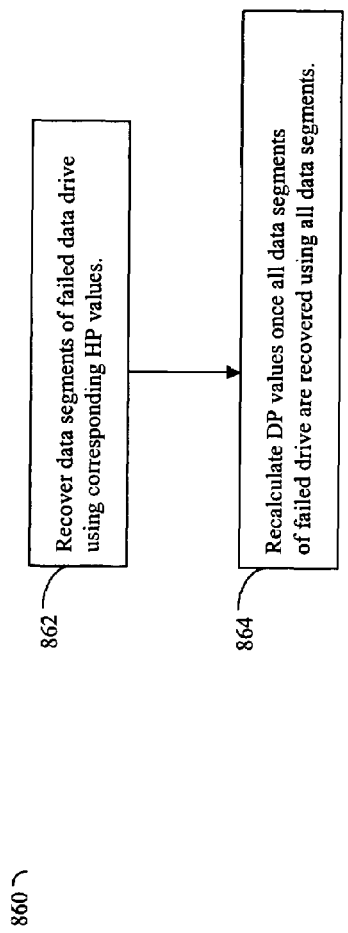
FIG. 15 is a flowchart of processing steps that may be performed in an embodiment for data recovery processing for a failed data drive and a second parity drive.

Referring now to FIG. 15, shown is a flowchart of processing steps that may be performed in an embodiment in connection with data recovery when two failed drives are a data drive and the DP drive. The steps of FIG. 15 summarize processing steps described above. At step 862, the data segments of the failed drive are recovered using HP values and data segments of non-failed drives included in each HP grouping, for example, as illustrated in FIG. 6. At step 864, once all data segments of the failed drive have been recovered, the DP values may be recalculated in accordance with the defined DP groupings, for example, as illustrated in FIG. 9.

Figure 16:
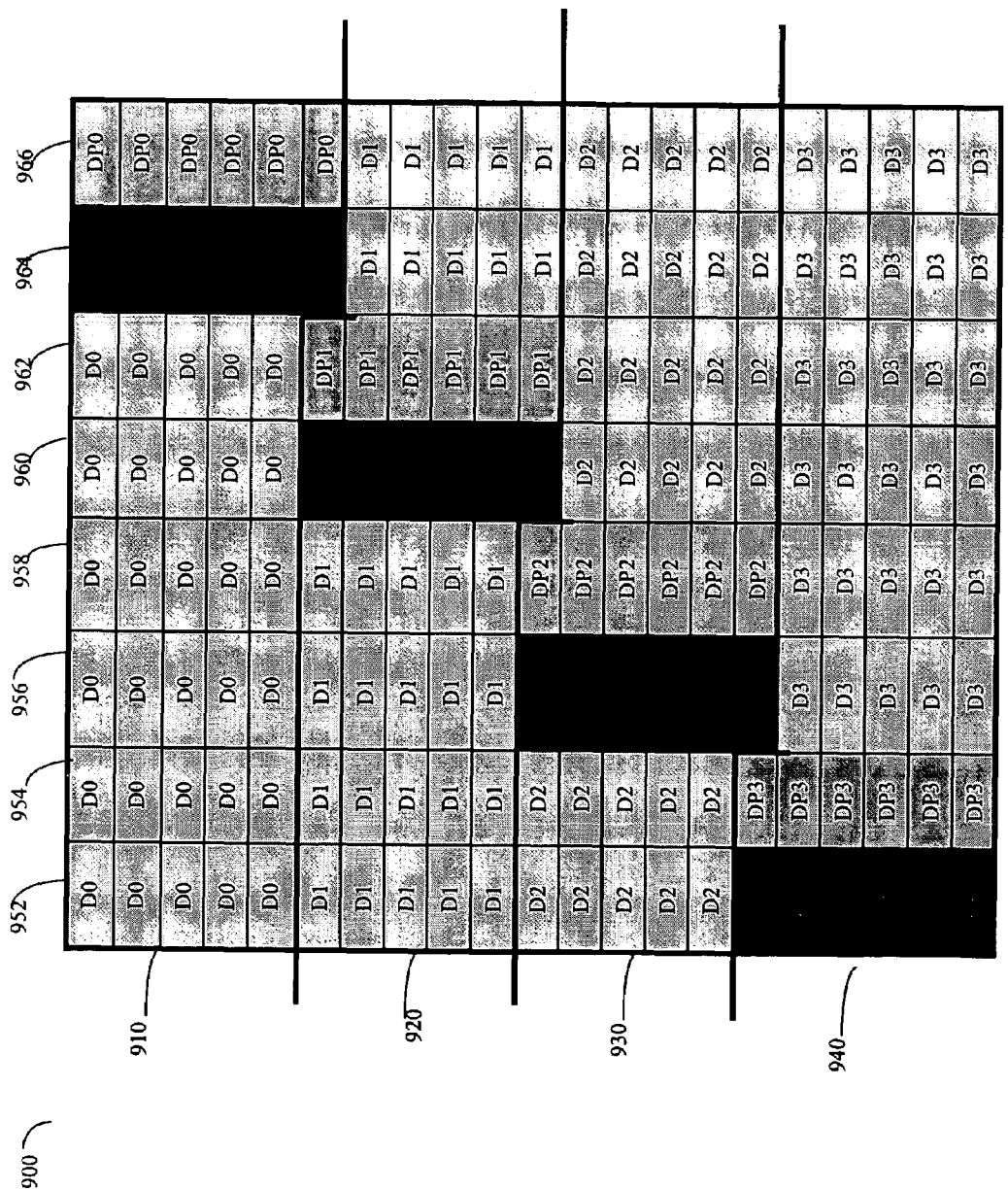
FIG. 16 is an example representation of one embodiment of a configuration of multiple data drives and associated parity drives utilizing the techniques described herein.

Referring now to FIG. 16, shown is an example representation of how a plurality of data drives and associated parity drives may be stored in an embodiment. FIG. 14 designates an example arrangement of multiple data segments, such as multiple instances of the representation 100 of FIG. 3. Elements 910, 920, 930 and 940 each designate one instance of N data drives and associated parity information. Using the arrangement of FIG. 3, there are N+1 HP parity segments and N+1 DP parity segments for N−1 rows of data. FIG. 14 shows one arrangement of the data drives and corresponding parity information. Other arrangements are possible as will be appreciated by those of ordinary skill in the art.

The techniques described herein may be implemented in hardware and/or software as may be included in a data storage system. For example, hardware and/or software associated with a disk controller may implement the techniques described herein in connection with updates made to a disk. The parity information may be stored in one or more locations.

With reference to FIG. 16 illustrated one example arrangement, element 910 refers to a first stripe, element 920 refers to a second stripe, element 930 a third stripe, and element 940 a fourth stripe. The parity information corresponding to each stripe is stored across different devices or drives of a same RAID group of devices. For example, the HP and DP parity information for data stripe 910 is stored on drives represented by columns 964 and 966, respectively. HP and DP parity information for data stripe 920 is stored on drives represented by columns 960 and 962, respectively, and so on for the other data stripes in the illustration. In one embodiment, the disk controllers store the parity information to the appropriate devices in accordance with the particular data segment which is the target of a data update operation, such as a write operation. Other arrangements of the storing the parity and corresponding data segments are possible using the techniques described herein.

The techniques described herein provide advantages over existing RAID-6 techniques. For example, the defined diagonal parity information used in connection with EVEN-ODD technique as described, for example, in "EVEN-ODD: An Efficient Scheme for Tolerating Double Disk Failures in RAID Architectures", IEEE Transactions on Computers, Vol. 44, No. 2, February 1995, by Blaum et al., defines diagonal parity information in which each cell of diagonal parity information uses a special diagonal parity. Thus, in connection with a single update to one data unit, updates to all diagonal parity cells are required. Additionally, during data rebuild operations for two data drives, additional calculations are needed to first produce the special diagonal parity. In contrast, the techniques described herein do not utilize a special diagonal parity. In connection with a write or other update operation described herein, the corresponding single diagonal parity information corresponding to the updated data segment is updated. In connection with a rebuild operation for a data segment, no special diagonal parity is required to be determined. Thus, the techniques described herein perform less XOR operations in connection with diagonal parity determinations resulting in less computational time, for example, during the rebuild operations. The EVEN-ODD approach utilizes 2*(N−1) XOR operations to determine the special diagonal parity and one additional XOR to determine the diagonal parity of each diagonal parity cell. Utilizing the techniques described herein for RAID-6, 2*N XOR operations may be saved during recovery processing for two data drives.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for performing data recovery processing for two failed devices included in a set of devices, the method comprising:
    providing said set of devices including N data devices, a horizontal parity device, and a diagonal parity device;
    determining which device in said set of devices corresponds to a first of the two failed devices;
    determining which device in said set of devices corresponds to a second of the two failed devices, each of said data devices being partitioned into N−1 data segments, said horizontal parity device including N horizontal parity segments each including parity information for a horizontal grouping of N−1 of said data segments, said diagonal parity device including N diagonal parity segments each including parity information for a diagonal grouping of N−1 of said data segments; and
    performing recovery processing to recover said two failed devices in accordance with the diagonal parity device, the horizontal parity device, and the data devices.

2. The method of claim 1, wherein said parity information for said horizontal parity segments and said diagonal parity segments is formed by performing a logical exclusive-OR operation upon a respective grouping of data segments for each of said parity segments.

3. The method of claim 1, wherein, if said two failed devices include a data device and a failed one of said parity devices, the other of said parity devices is used in recovering data segments of the failed data device, and the recovered data segments of the failed data device and data segments of non-failing data devices are used to recover parity information of the failed parity device.

4. The method of claim 1, wherein if only a single data device fails, the method further comprising:
    using at least one of said parity devices in recovering data segments of said single data device.

5. The method of claim 1, further comprising:
    receiving an update operation for a first data segment;
    updating a first corresponding parity segment of said horizontal parity device formed using a first defined set of data segments including said first data segment; and
    updating a second corresponding parity segment of said diagonal parity device formed using a second defined set of data segments including said first data segment.

6. The method of claim 1, wherein said recovery processing includes recovering a first data segment at a first processing point, and using said first data segment to recover another data segment at a subsequent processing point.

7. The method of claim 1, wherein said recovery processing includes recovering a first portion of segments of a failed device in parallel at a first point in processing, and recovering a second portion of segments of a failed device in parallel at a second pointing processing in accordance with data dependencies of said failed devices.

8. The method of claim 1, wherein said N*(N−1) data segments are numbered consecutively and each ith horizontal parity segment is formed using a next portion of N−1 consecutively numbered data segments.

9. The method of claim 1, wherein each jth diagonal parity segment is formed using N−1 data segments located on one or more diagonal lines associated with a jth data segment grouping, said data segments of said N devices are arranged in a matrix of N columns and N−1 rows, each column corresponding to a device and including data segments of that device, an integer value being associated with each set of data segments falling on each diagonal line of said matrix, diagonal lines being drawn in a single direction, data segments included in a jth group include those data segments falling on one or more diagonal lines each having an integer value, d, where d mod N=j, said diagonal lines being consecutively numbered integers.

10. A computer readable medium comprising executable code stored thereon for performing data recovery processing for two failed devices included in a set of devices, the computer readable medium comprising executable code that:
    determines which device in said set of devices corresponds to a first of the two failed devices, said set of devices including N data devices, a horizontal parity device, and a diagonal parity device;
    determines which device in said set of devices corresponds to a second of the two failed devices, each of said data devices being partitioned into N−1 data segments, said horizontal parity device including N horizontal parity segments each including parity information for a horizontal grouping of N−1 of said data segments, said diagonal parity device including N diagonal parity segments each including parity information for a diagonal grouping of N−1 of said data segments; and performs recovery processing to recover said two failed devices in accordance with the diagonal parity device, the horizontal parity device, and the data devices.

11. The computer readable medium of claim 10, wherein said parity information for said horizontal parity segments and said diagonal parity segments is formed by performing a logical exclusive-OR operation upon a respective grouping of data segments for each of said parity segments.

12. The computer readable medium of claim 10, wherein, if said two failed devices include a data device and a failed one of said parity devices, the other of said parity devices is used in recovering data segments of the failed data device, and the recovered data segments of the failed data device and data segments of non-failing data devices are used to recover parity information of the failed parity device.

13. The computer readable medium of claim 10, wherein if only a single data device fails, the computer readable medium further comprising executable code that:

uses at least one of said parity devices in recovering data segments of said single data device.

14. The computer readable medium of claim 10, further comprising executable code that:

receives an update operation for a first data segment;

updates a first corresponding parity segment of said horizontal parity device formed using a first defined set of data segments including said first data segment; and updates a second corresponding parity segment of said diagonal parity device formed using a second defined set of data segments including said first data segment.

15. The computer readable medium of claim 10, wherein said recovery processing includes recovering a first data segment at a first processing point, and using said first data segment to recover another data segment at a subsequent processing point.

16. The computer readable medium of claim 10, wherein said recovery processing includes recovering a first portion of segments of a failed device in parallel at a first point in processing, and recovering a second portion of segments of a failed device in parallel at a second pointing processing in accordance with data dependencies of said failed devices.

17. The computer readable medium of claim 10, wherein said N*(N−1) data segments are numbered consecutively and each ith horizontal parity segment is formed using a next portion of N−1 consecutively numbered data segments.

18. The computer readable medium of claim 10, wherein each jth diagonal parity segment is formed using N−1 data segments located on one or more diagonal lines associated with a jth data segment grouping, said data segments of said N devices are arranged in a matrix of N columns and N−1 rows, each column corresponding to a device and including data segments of that device, an integer value being associated with each set of data segments falling on each diagonal line of said matrix, diagonal lines being drawn in a single direction, data segments included in a jth group include those data segments falling on one or more diagonal lines each having an integer value, d, where d mod N=j, said diagonal lines being consecutively numbered integers.

19. A system comprising:

a set of devices including N data devices, a horizontal parity device, and a diagonal parity device, each of said data devices being partitioned into N−1 data segments, said horizontal parity device including N horizontal parity segments each including parity information for a horizontal grouping of N−1 of said data segments, said diagonal parity device including N diagonal parity segments each including parity information for a diagonal grouping of N−1 of said data segments;

code that determines whether there are two failed devices, and whether each of said two failed devices is one of said data devices, said horizontal parity device, or said diagonal parity device, and code that performs recovery processing to recover said two failed devices in accordance with the diagonal parity device, the horizontal parity device, and the data devices.

20. The system of claim 19, wherein each jth diagonal parity segment is formed using N−1 data segments located on one or more diagonal lines associated with a jth data segment grouping, said data segments of said N devices are arranged in a matrix of N columns and N−1 rows, each column corresponding to a device and including data segments of that device, an integer value being associated with each set of data segments falling on each diagonal line of said matrix, diagonal lines being drawn in a single direction, data segments included in a jth group include those data segments falling on one or more diagonal lines each having an integer value, d, where d mod N=j, said diagonal lines being consecutively numbered integers.

* * * * *

UNITED STATES PATENT AND TRADEMARK OFFICE
CERTIFICATE OF CORRECTION

PATENT NO.       : 7,577,866 B1                                    Page 1 of 1
APPLICATION NO. : 11/167704
DATED            : August 18, 2009
INVENTOR(S)      : Fan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 958 days.

Signed and Sealed this

Seventh Day of September, 2010

David J. Kappos
*Director of the United States Patent and Trademark Office*